Aug. 9, 1966  D. M. ZABRISKIE  3,266,047
BELT DRIVE ASSEMBLY FOR FACSIMILE RECORDER
Filed June 15, 1961  2 Sheets-Sheet 2
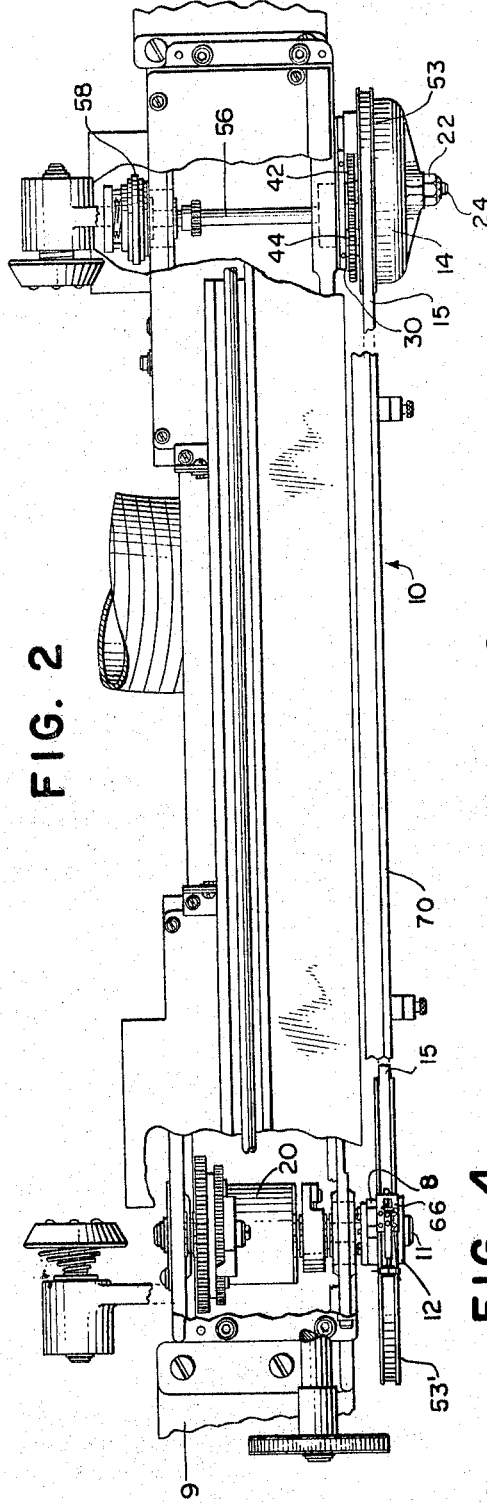
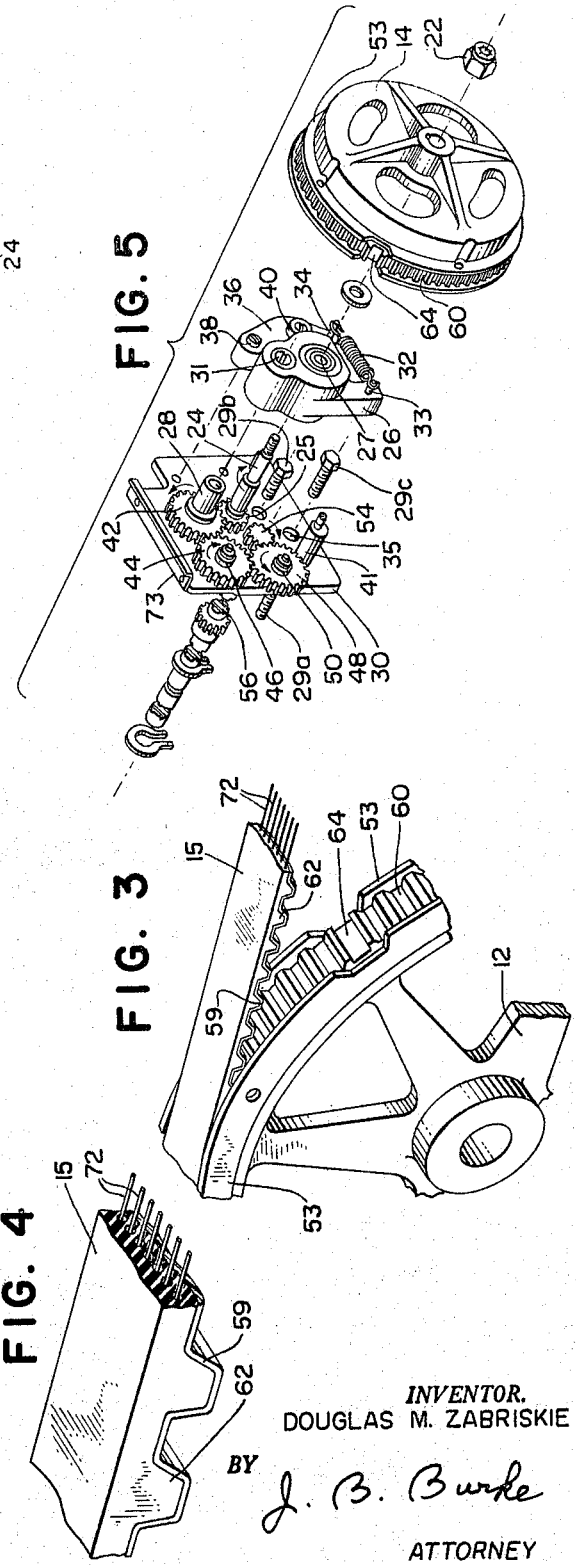
INVENTOR.
DOUGLAS M. ZABRISKIE
BY J. B. Burke
ATTORNEY

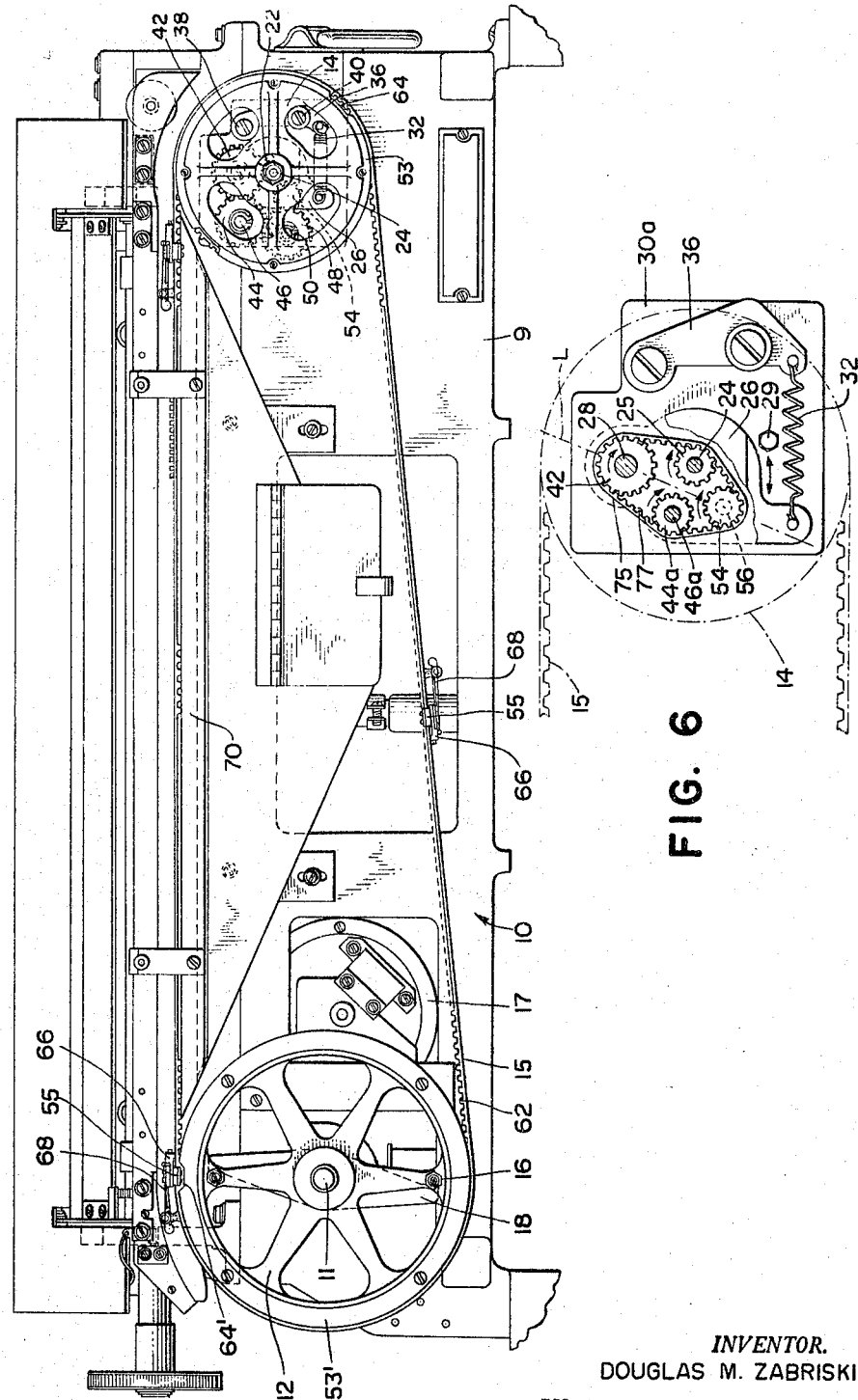

United States Patent Office 3,266,047
Patented August 9, 1966

3,266,047
BELT DRIVE ASSEMBLY FOR FACSIMILE RECORDER
Douglas M. Zabriskie, Northvale, N.J., assignor to The Western Union Telegraph Company, New York, N.Y., a corporation of New York
Filed June 15, 1961, Ser. No. 117,309
11 Claims. (Cl. 346—139)

This invention concerns an improved tensioning device for a belt comprising styluses in an electrical facsimile recorder.

In my prior United States Patent 2,770,517, I proposed to employ a flexible toothed belt carrying styluses for electric writing on a recording medium in a facsimile recorder. The toothed belt was fabricated with moulded rubber teeth and contained stranded steel wires embedded in the belt. The belt was carried on two pulleys one of which was an idler and the other was driven on a fixed axis by a drive motor.

The present invention is directed at an improvement in this arrangement. I have found that it is necessary to tension the belt properly to minimize vibrations in the styluses carried by the belt. Due to variations in loading of the belt the tensioning must be variable to compensate for the variations in loading. The present invention accomplishes this purpose by providing a novel run pulley drive for the flexible belt. This drive includes a spur gear train having a driving gear and a series of idler gears operatively coupled thereto. The last one of the idler gears meshes with a driven gear on a shaft of the run pulley. The shaft is rotatably mounted on a pivoted spring loaded lever. The lever pivots on the center of the last one of the idler gears. This arrangement permits the run pulley to oscillate against spring bias to maintain a constant tension on the belt. The belt now employed has a nylon fabric facing which resists wear, requires no lubrication, and insures quiet running of the belt.

It is therefore a principal object of the present invention to provide an improved mounting, drive and tensioning means for a stylus carrying flexible belt in a facsimile recorder.

It is another object to provide a floating, spring mounted support for a driven run pulley in a facsimile recorder to maintain constant tension and reduce oscillations in a flexible belt carried by the pulley.

The invention will be best understood from the following detailed description taken together with the drawings, wherein:

FIG. 1 is a front view of a facsimile recorder, embodying the invention, parts of the recorder being broken away;

FIG. 2 is top plan view of part of the recorder of FIG. 1, parts being broken away to show internal construction;

FIG. 3 is a fragmentary perspective view of a pulley and belt employed in the recorder;

FIG. 4 is a fragmentary perspective view on an enlarged scale of the belt per se;

FIG. 5 is an exploded perspective view of the driven run pulley and mounting members therefor; and FIG. 6 is a diagram of a floating drive assembly according to the invention.

In FIGS. 1 and 2 is shown a facsimile recorder assembly 10 including a base frame 9. The recorder has a larger diameter pulley 12 and a smaller diameter pulley 14 on which is entrained endless belt 15. The larger pulley 12 is operated as an idler pulley on shaft 11. Pulley 12 carries studs 16 which are engaged by an arm 18 secured on shaft 11 connected to a clutch assembly 20. The clutch assembly is connected to and driven by a synchronous motor 17 at a uniform speed.

Pulley 14, as best shown in FIGS. 1 and 5 is secured by a nut on a shaft 24 which drives the pulley. This shaft is journaled in a bearing 27 for rotation in a lever 26. The lever is pivotally mounted on a shaft 28 rotatably supported by a generally rectangular plate 30 and held by screw 31. A spring 32 is connected between a pin 33 at the bottom of lever 26 and a pin 34 at the bottom of a tensioning lever 36. The lever 36 is mounted on plate 30 by screws 38, 40. On shaft 28 is secured an idler gear 42 meshed with another idler gear 44 carried on a shaft 46 rotatably supported by plate 30. Spur gear 25 on shaft 24 is meshed with and driven by gear 42. Idler gear 44 is meshed in turn with a third idler gear 48 carried on a shaft 50 rotatably supported by plate 30. Gear 48 is meshed with and driven by a smaller spur gear 54. This gear is carried on shaft 56 which extends through the plate 30 and terminates at a run slip clutch assembly 58; see FIG. 2. The clutch assembly is driven by an induction motor (not shown). A gear shield 73 may be mounted on the upper edge of plate 30.

In operation, an induction motor drives pulley 14 via the clutch and gear train described at a linear speed which is somewhat greater than the linear speed of rotation of arm 18. The belt 15 tends to be overdriven by pulley 14 due to engagement of arm 18 against studs 16 slipping of clutch 58 occurs and belt 15 is rstrained to movement at a predetermined constant speed. If any change in tension should tend to occur, lever 26 is pivoted under bias of spring 32 to retain the tension in the belt constant. The plate 30 is secured to the frame of the recorder by three bolts 29a, 29b, 29c inserted through holes 35. The plate rotatably supports shaft 56 on the end of which is gear 54. The pulley 14 floats on the plate 30 by reason of the pivotal support of lever 26. Since shaft 24 is axially spaced from shaft 28 a fixed distance, meshing of gears 25 and 42 is maintained at all pivotal positions of shaft 24, lever 26 and pulley 14. A stop bar 41 limits angular movement of lever 26, on plate 30.

The pulley 14 shown in FIGS. 1, 2 and 5, has spaced recesses 60 on its periphery which are engaged by cogs or teeth 62 formed on the inner surface of belt 15. Lateral flanges 53 on the pulley constrain the belt against lateral movement. Cut-outs or grooves 64 formed in pulley 14 are provided to receive clamp portions 55 of stylus holders 66 mounted in spaced positions on the outer side of belt 15. The holders 66 carry individual adjustable stylus members 68. The styluses are operative to record electrically on a suitable recording medium in the recorder while the styluses are carried in the upper straight course of the belt parallel to belt guide 70. Pulley 12 has teeth corresponding to teeth 60 and side flanges 53 like flanges 53, cut-out 64 receives each holder clamp 55 as shown in FIG. 1.

In FIGS. 3 and 4 are shown the stranded wires or cables 72 which are embedded in the body of the belt. The belt body formed may be of neoprene or other suitable synthetic rubber composition. The teeth 62 are integrally moulded in the belt body at the inner side of the belt. A nylon fabric facing 59 may be applied and secured to the inner side of the belt and covers the teeth 62. This facing is wear-resistant, dimensionally stable, and sufficiently smooth so that no lubrication is required for the belt. The embedded wire cables 72 insure longitudinal dimensional stability of the belt so that the spacing of the teeth remains constant. The spacing of the teeth is determined and fixed by precision moulding of the belt body.

The assembly described insures that the styluses carried by the belt are free from lateral and longitudinal vibrations which might otherwise be transmitted from the belt so that the resulting recording by the styluses on the recording paper or other recording medium has optimum definition, fidelity and clarity.

In FIG. 6 is shown another form of floating drive mechanism for the pulley 14 on which is carried the belt 15. Plate 30a is mounted on the frame of the recorder by a plurality of bolts 29, only one of which is shown in the drawing. Lever 26 pivots on shaft 28 carried rotatably by plate 30a. Idler gear 42 is mounted on shaft 28. Spur gear 25 is mounted on shaft 24 which passes through and is rotatably journaled in lever 26. Shaft 24 carries and drives the pulley 14. Spur gear 54 is mounted on the end of shaft 56 passing through and journaled in plate 30a. This shaft 56 has a fixed axis of rotation and is driven by a motor in the recorder. Idler gear 44a is carried on a stub shaft 46a rotatably mounted on and carried by the lever 26. An endless belt 75 having inner cogs 77 is entrained around gears 25, 42, 44a and 54. Spring 32 is engaged between tensioning member 36 on plate 30a and the lower end of lever 26.

In operation of the mechanism of FIG. 6, drive shaft 56 turns drive gear 54 which drives the belt 75 to rotate idler gears 46a, and 42, and pulley drive gear 25. The pulley 14 is thus rotated and positively driven by the drive shaft 56. Suppose tension on belt 15 varies, the common floating axis of shaft 24, gear 25 and pulley 14 will move arcuately around the axis of shaft 28 as lever 26 pivots on shaft 28. Since the distances between the center of shaft 28 and centers of shafts 24 and 46a remain the same, positive drive engagement of the belt 77 with all gears is maintained. This arrangement has an advantage in that the operation of the mechanism is quieter since direct engage-between gears is avoided and only the rubber belt meshes with the gears. If desired, pulleys may be used instead of gears, and belt 75 could be a flat, round or V-shaped traction belt without teeth. Alternately sprockets could be substituted for the gears and belt 77 may be replaced by an endless chain. In all arrangements, the spring 32 maintains tension in belt 15 as the lever 26 is pivoted. In all arrangements the driven gear member 25 and idler gear member 44a will be equally displaced angularly relative to line 1 intersecting the centers of the drive gear 54 and the idler gear 42, so that the relation of the length of belt 77 to the groups of gears will not be changed during the limited oscillations of lever 26.

I claim:

1. An automatically tensioned belt drive, comprising in combination: an endless flexible belt having cogs formed on the inner surface thereof, a pair of pulleys each having circumferentially spaced recesses engaged by said cogs, said belt being entrained on said pulleys, means rotatably supporting one of the pulleys for rotation on a fixed axis, tensioning means rotatably supporting the other of said pulleys on a floating axis parallel to said fixed axis, and drive means operatively connected to said tensioning means for driving said other pulley, said tensioning means comprising a plate, three idler gears rotatably mounted on said plate in mesh with each other, a first one of said gears having a shaft extending outwardly from the plate, a lever pivotally engaged at one end on said shaft, a second shaft rotatably carried by said lever near the other end thereof, a spur gear at one end of said second shaft engaged with the first idler gear, a tensioning member on said plate, a spring connected between said other end of the lever and said tensioning member to bias the lever toward said member and away from said fixed axis, a drive shaft extending through said plate, and a second spur gear on said drive shaft engaged with another of said idler gears, said other pulley being axially mounted on said second shaft, said drive means being connected to said drive shaft, whereby said belt is maintained at predetermined tension between the pulleys as said lever pivots in response to varying load on said belt.

2. An automatically tensioned belt drive, comprising in combination: an endless flexible belt having cogs formed on the inner surface thereof, a pair of pulleys each having circumferentially spaced recesses engaged by said cogs, said belt being entrained on said pulleys, means rotatably supporting one of the pulleys for rotation on a fixed axis, tensioning means rotatably supporting the other of said pulleys on a floating axis parallel to said fixed axis, and drive means operatively connected to said tensioning means for driving said other pulley, said tensioning means comprising a support, a train of idler gears rotatably mounted on said support in mesh with each other, a first one of said gears having a shaft extending outwardly from said support, a lever pivotally engaged at one end on said shaft a second shaft rotatably carried by said lever near the other end thereof, another gear outside of said train of gears at one end of said second shaft engaged with the first idler gear, a tensioning member on said support, a spring connected between the other end of said lever and said member to bias the lever toward said member and away from said fixed axis, a drive shaft extending through said support, and still another gear outside of said train of gears engaged with another of said idler gears, said other pulley being axially mounted on said second shaft, said drive means being connected to said drive shaft, whereby said belt is maintained at a predetermined tension between the pulleys as said lever pivots in response to varying load on the belt.

3. In a facsimile recorder of the kind employing electric writing on a recording medium, in combination: an endless belt of flexible organic material, stranded wires embedded longitudinally in the interior of the belt, cogs formed on the inner surface of the belt, a pair of belt carrying pulleys each having circumferentially spaced recesses on the periphery for engaging the cogs of the belt, a plurality of stylus holders affixed to the belt, styluses carried by said holders for writing electrically on said medium during a portion of travel of the belt, means rotatably supporting one of the pulleys for rotation on a fixed axis, tensioning means rotatably supporting the other of said pulleys on a floating axis with respect to said fixed axis, and drive means operatively connected to said tensioning means for driving said other pulley, said tensioning means comprising a plate, three idler gears rotatably mounted on said plate in mesh with each other, a first one of said gears having a shaft extending outwardly from the plate, a lever pivotally engaged at one end on said shaft, a second shaft rotatably carried by said lever near the other end thereof, a spur gear at one end of said second shaft engaged with the first idler gear, a tensioning member on said plate, a spring connected between said other end of the lever and said tensioning member to bias the lever toward said member and away from said fixed axis, a drive shaft extending through said plate, and a second spur gear on said drive shaft engaged with another of said idler gears, said other pulley being axially mounted on said second shaft, said drive means being connected to said drive shaft, whereby said belt is maintained at predetermined tension between the pulleys as said lever pivots in response to varying load on said belt, so that the styluses are held in continuous contact with said recording medium while being carried along said portion of travel of the belt.

4. In a facsimile recorder of the kind employing electric writing on a recording medium, in combination: an endless belt of flexible organic material, stranded wires embedded longitudinally in the interior of the belt, cogs formed on the inner surface of the belt, a pair of belt carrying pulleys each having circumferentially spaced recesses on the periphery for engaging the cogs of the belt, a plurality of stylus holders affixed to the belt, styluses carried by said holders for writing electrically on said medium during a portion of travel of the belt, means rotatably supporting one of the pulleys for rotation on a fixed axis, tensioning means rotatably supporting the other of said pulleys on a floating axis with respect to said fixed axis, and drive means operatively connected to said tensioning means for driving said other pulley, said tensioning means comprising a support, a train of idler gears rotatably mounted on said support in mesh with each other, a first one of said gears having a shaft extending outwardly from said support, a lever pivotally engaged at one end on said shaft a second shaft rotatably carried by said lever near the other end thereof, another gear outside of said train of gears at one end of said second shaft engaged with the first idler gear, a tensioning member on said support, a spring connected between the other end of said lever and said member to bias the lever toward said member and away from said fixed axis, a drive shaft extending through said support, and still another gear outside of said train of gears engaged with another of said idler gears, said other pulley being axially mounted on said second shaft, said drive means being connected to said drive shaft, whereby said belt is maintained at a predetermined tension between the pulleys as said lever pivots in response to varying load on the belt, so that the styluses are held in continuous contact with said recording medium while being carried along said portion of travel of the belt.

5. A tensioning device for an endless belt, comprising a pulley adapted for driving said belt at the periphery of the pulley, a plate, three idler gears rotatably mounted on said plate in mesh with each other, a first one of said gears having a shaft extending outwardly from the plate, a lever pivotally engaged at one end on said shaft, a second shaft rotatably carried by said lever near the other end thereof, a spur gear at one end of said second shaft engaged with the first idler gear, a tensioning member on said plate, a spring connected between said other end of the lever and said tensioning member to bias the lever toward said member and away from said fixed axis, a drive shaft extending through said plate, and a second spur gear on said drive shaft engaged with another of said idler gears, said pulley being axially mounted on said second shaft, whereby said belt is maintained at a predetermined tension on said pulley as said lever pivots in response to varying load on said belt when said drive shaft is rotated.

6. A tensioning device for an endless belt, comprising a pulley adapted for driving said belt at the periphery of the pulley, a support, a train of idler gears rotatably mounted on said support in mesh with each other, a first one of said gears having a shaft extending outwardly from said support, a lever pivotally engaged at one end on said shaft, a second shaft rotatably carried by said lever near the other end thereof, another gear outside of said train of gears at one end of said second shaft engaged with the first idler gear, a tensioning member on said support, a spring connected between the other end of said lever and said member to bias the lever toward said member and away from said fixed axis, a drive shaft extending through said support, and still another gear outside of said train of gears engaged with another of said idler gears, said pulley being axially mounted on said second shaft, whereby said belt is maintained at a predetermined tension on said pulley as said lever pivots in response to varying load on said belt when said drive shaft is rotated.

7. In a facsimile recorder of the kind employing electric writing on a recording medium, in combination: an endless belt of flexible organic material, stranded wires embedded longitudinally in the interior of the belt, cogs formed on the inner surface of the belt, a pair of belt carrying pulleys each having circumferentially spaced recesses on the periphery for engaging the cogs of the belt, a plurality of stylus holders affixed to the belt, styluses carried by said holders for writing electrically on said medium during a portion of travel of the belt, means rotatably supporting one of the pulleys for rotation on a fixed axis, tensioning means rotatably supporting the other of said pulleys on a floating axis with respect to said fixed axis, drive means operatively connected to said tension means for driving said other pulley, and motor driven retarding means tending to rotate the first pulley at a predetermined speed slower than the speed of said drive means, so that the styluses are held in continuous contact with said recording medium while being carried along said portion of travel of the belt.

8. An automatically tensioned belt drive, comprising in combination: an endless flexible belt having cogs formed on the inner surface thereof, a pair of pulleys each having circumferentially spaced recesses engaged by said cogs, said belt being entrained on said pulleys, means rotatably supporting one of the pulleys for rotation on a fixed axis, tensioning means rotatably supporting the other of said pulleys on a floating axis parallel to said fixed axis, said tensioning means comprising a support, a train of idler gears rotatably mounted on said support in mesh with each other, a first one of said gears having a shaft extending outwardly from said support, a lever pivotally engaged at one end on said shaft a second shaft rotatably carried by said lever near the other end thereof, another gear outside of said train of gears at one end of said second shaft engaged with the first idler gear, a tensioning member on said support, a spring connected between the other end of said lever and said member to bias the lever toward said member and away from said fixed axis, a drive shaft extending through said support, and still another gear outside of said train of gears engaged with another of said idler gears, said other pulley being axially mounted on said second shaft, drive means connected via a slip clutch to said drive shaft for driving said other pulley, and motor driven retarding means tending to rotate the first pulley at a predetermined speed slower than the speed of said drive means.

9. An automatically tensioned belt drive, comprising in combination: an endless flexible belt having cogs formed on the inner surface thereof, a pair of pulleys each having circumferentially spaced recesses engaged by said cogs, said belt being entrained on said pulleys, means rotatably supporting one of the pulleys for rotation on a fixed axis, tensioning means rotatably supporting the other of said pulleys on a floating axis parallel to said fixed axis, said tensioning means comprising a plate, three idler gears rotatably mounted on said plate in mesh with each other, a first one of said gears having a shaft extending outwardly from the plate, a lever pivotally engaged at one end on said shaft, a second shaft rotatably carried by said lever near the other end thereof, a spur gear at one end of said second shaft engaged with the first idler gear, a tensioning member on said plate, a spring connected between said other end of the lever and said tensioning member to bias the lever toward said member and away from said fixed axis, a drive shaft extending through said plate, and a second spur gear on said drive shaft engaged with another of said idler gears, said other pulley being axially mounted on said second shaft, drive means connected via a slip clutch to said drive shaft for driving said other pulley, and motor driven retarding means tending to rotate the first pulley at a predetermined speed slower than the speed of said drive means.

10. An automatically tensioned belt drive, comprising in combination: an endless flexible belt having cogs formed on the inner surface thereof, a pair of pulleys each having circumferentially spaced recesses engaged by said cogs, said belt being entrained on said pulleys, means rotatably supporting one of the pulleys for rotation on a fixed axis, tensioning means rotatably supporting the other of said pulleys on a floating axis parallel to said fixed axis, and drive means operatively connected to said tensioning means for driving said other pulley, said tensioning means comprising a stationary plate, a drive shaft journaled for rotation on a fixed axis and extending through said plate, a drive member on said shaft, a second shaft rotatably journaled on said plate and carrying a lever thereon free to pivot on the second shaft, an idler member mounted on the second shaft, a third shaft carrying a second idler member and journaled to rotate on said lever, a fourth shaft journaled to rotate in said lever and carrying said other pulley, another drive member mounted on the fourth shaft, an endless transmission member entrained on the drive members and idler members, and a spring means engaged between the lever and plate maintaining tension in the endless belt as the lever pivots while said belt is operatively driven by said drive means.

11. A tensioning device for an endless belt comprising a pulley adapted for driving said belt at the periphery of the pulley, a stationary support, a drive shaft journaled for rotation on a fixed axis and extending through said support, a drive member on said shaft, a second shaft rotatably journaled on said support and carrying a lever thereon free to pivot on the second shaft, idler member mounted on the second shaft, a third shaft carrying a second idler member and journaled to rotate on said lever, a fourth shaft journaled to rotate in said lever and carrying said other pulley, another drive member mounted on the fourth shaft, an endless transmission member entrained on the drive members and idler members, and spring means engaged between the lever and support maintaining tension in said endless belt as the lever pivots while said belt is operatively driven by said drive shaft.

References Cited by the Examiner

UNITED STATES PATENTS

| | | | |
|---|---|---|---|
| 2,074,078 | 3/1937 | Swift | 74—242.13 |
| 2,690,084 | 9/1954 | Van Dam | 74—242.13 |
| 2,770,517 | 11/1956 | Zabriskie | 346—74 |
| 2,814,547 | 11/1957 | Cooley | 346—74 |

DAVID J. WILLIAMOWSKY, *Primary Examiner*.

E. JAMES SAX, *Examiner*.

M. K. KIRK, J. A. WONG, *Assistant Examiners*.